United States Patent

Ogura (10) Patent No.: US 6,236,450 B1
(45) Date of Patent: May 22, 2001

(54) DOCUMENT FEEDING METHOD FOR AUTOMATIC DOCUMENT FEEDER

(75) Inventor: Masahiko Ogura, Yokohama (JP)

(73) Assignees: Toshiba Tec Kabushiki Kaisha, Tokyo (JP); Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/392,247

(22) Filed: Sep. 9, 1999

(30) Foreign Application Priority Data

Sep. 18, 1998 (JP) .................................................. 10-264836

(51) Int. Cl.[7] .......................... G03B 27/00; G03G 15/00; B65H 5/22; B65H 83/00
(52) U.S. Cl. .............................. 355/407; 399/19; 399/21; 271/3.06; 271/3.13
(58) Field of Search .............................. 355/407; 399/19, 399/21; 271/3.06, 3.13

(56) References Cited

U.S. PATENT DOCUMENTS

| 4,521,102 | 6/1985 | Motomura et al. ..................... 355/14 |
| 4,730,204 | 3/1998 | Satoh et al. .............................. 355/14 |
| 5,105,229 | 4/1992 | Ozaki ..................................... 355/313 |
| 5,107,299 | 4/1992 | Farrell et al. .......................... 355/207 |
| 5,322,274 | 6/1994 | Takahashi et al. .................... 271/258 |
| 5,517,295 | * 5/1996 | Kaneko et al. ....................... 355/313 |
| 5,745,661 | * 4/1998 | Koh et al. ............................... 399/19 |
| 5,761,567 | 6/1998 | Yoshizuka .............................. 399/17 |
| 5,933,677 | * 8/1999 | Lee ......................................... 399/19 |
| 5,970,274 | * 10/1999 | Rath ....................................... 399/21 |

FOREIGN PATENT DOCUMENTS

| 54-155058 | 12/1979 | (JP) . |
| 61-144667 | 2/1986 | (JP) . |
| 3-233570 | 10/1991 | (JP) . |
| 9-251257 | 9/1997 | (JP) . |

* cited by examiner

Primary Examiner—Russell Adams
Assistant Examiner—Khaled Brown
(74) Attorney, Agent, or Firm—Foley & Lardner (57) ABSTRACT

An image forming apparatus is provided with an automatic document feeder. Even if a document is jammed in the automatic document feeder, what is required of the user is to set all documents on a document tray once again, including the jammed document, documents from which image information have already been copied, and documents from which image information have not yet been copied. Of the documents re-set on the document tray, the documents from which image information have been copied are discharged onto a discharge tray, without executing a copying operation. In other words, a copying operation is executed only for the documents from which image information have not been copied. The number of documents from which image information are copied is counted by checking the outputs from an alignment sensor. The operation for feeding documents from the document tray to the discharge tray without a copying operation continues until the count n of a recovery counter and the count N of a document counter become equal to each other. After the two counts become equal, the documents fed from the document tray are subjected to a copying operation.

14 Claims, 8 Drawing Sheets

DOCUMENT FEEDING METHOD FOR AUTOMATIC DOCUMENT FEEDER

BACKGROUND OF THE INVENTION

The present invention relates to an image forming apparatus for successively feeding sheet-like objects by means of an automatic document feeder and copying the image information regarding images formed on the objects.

A copying apparatus that utilizes an electrostatic copying process is an example of an image forming apparatus. In the copying apparatus, an image on a document to be copied is represented in the form of image information that indicate the light and shade portions of the image. An electrostatic latent image is formed on a photosensitive body in accordance with the image information, and the electrostatic latent image is then visualized with toner (i.e., a developer), thus making a copy of the document.

A developer image, i.e., the visualized latent image, is output to recording mediums, such as sheets of paper.

An automatic document feeder, which successively feeds sheet-like objects to an image formation section one by one, is in widespread use since the use of such a feeder helps lighten the load that is imposed on the user at the time of a copying operation.

In the case where copies are made, with original documents being successively fed by an automatic document feeder, a document feed error (a paper jam or a document jam) may occur in the feeding mechanism of the automatic document feeder. In this happens, several of the original documents, which are being fed then, will stop and stay at different positions inside the automatic document feeder.

If, due to the document jam, a number of original documents stay at different positions inside the document feeder, the user has to determine which document should be returned to the automatic document feeder. To be more specific, the user has to compare the images on the copies discharged and stacked on a discharge section of the copying apparatus with those images which are shown on the documents which are being fed or have not yet been fed at the time of the document jam. By this comparison, the user discriminates between documents from which image information have already been copied and documents from which image information have not yet been copied. After re-setting the documents that have to be returned to the automatic document feeder, the copying operation is resumed.

If the original documents are sheets which bears images on both sides, or if the copies produced by the copying operation are sheets which bear images on both sides, the operation for identifying documents that should be returned to the automatic document feeder, requires much time, and the time needed for the copying operation is inevitably long.

It is likely that the documents from which copies have already been made will be erroneously subjected to the copying operation once again, resulting in extra copies. It is also likely that the documents which should be subjected to the copying operation will be overlooked, resulting in failure to make copies of all documents. If copies to be made bear images on both sides, documents that should be re-set must be determined without an error. If an error is made in this determination, the pages of the images on the copies will be numbered erroneously. The copies having such erroneous page numbering may be useless.

BRIEF SUMMARY OF THE INVENTION

Accordingly, an object of the present invention is to provide an image forming apparatus which performs a successive copying operation using an automatic document feeder and which can resume the successive copying operation with high efficiency even after the occurrence of a document feed stop (document jam).

To achieve this object, the present invention provides an image forming apparatus provided with an automatic document feeder and comprising:

a document table for holding a document;

an image forming section for making a copy of the document by performing an image forming operation, the image forming operation including forming an electrostatic image corresponding to image light which is obtained by radiating light onto the document held on the document table, and supplying a visualizing agent to the electrostatic image;

a document feeding/discharging device for feeding a document to the document table, stopping the document when the document comes to a predetermined position on the document table, and discharging the document to a position away from an image information reading area after image information are read from the document located there so as to permit the image forming section to execute the image forming operation;

a feed state monitoring device for monitoring how the document is fed or discharged by the document feeding/discharging device; and a control device for detecting a state where a document fed by the document feeding/discharging device is jammed in a feeder section of the document feeding/discharging device, determining those documents from which image information are not read, on the basis of monitor results output from the feed state monitoring device, and resuming the image forming operation only for the documents from which the image information are not read.

The present invention also provides an image forming apparatus comprising:

a document table for holding a document;

an image forming section for making a copy of the document by performing an image forming operation, the image forming operation including forming an electrostatic image corresponding to image light which is obtained by radiating light onto the document held on the document table, and supplying a visualizing agent to the electrostatic image;

a document feeding device including a document holder section for holding a preset number of sheetlike documents, and a feeder mechanism, the feeder mechanism feeding documents from the documents holder section to the document table one by one, stopping each of the documents when the document comes to a predetermined position on the document table, and discharging the documents to a predetermined position when images on the documents have been read for the image forming operation;

a plurality of sensors for locating where in the feeder mechanism a document is jammed during a feeding operation;

a display device, operating when the document is jammed in the feeder mechanism, for indicating that all documents should be set in the document holder section once again, including documents from which image information are read for image formation, the document jammed in the feeder mechanism, and documents remaining in the document holder section; and a feed control device for controlling a document feed operation on the basis of a position which is detected by the sensors and at which the document is jammed in the feeder mechanism, the document feed operation being controlled such that the documents from which the image information are read are fed to the predetermined position without being stopped on the document table, and the documents from which the image information are not read and subsequently-fed documents are temporarily stopped at a predetermined position on the document table and are discharged to the predetermined position after document images are read therefrom for the image forming operation.

The present invention further provides an image forming apparatus comprising:

a document feeding device for feeding a plurality of documents to a predetermined position on a document table one by one and for discharging the documents from the document table to a predetermined discharge position at predetermined timings;

a first sensor for checking whether or not a document fed by the document feeding device reaches the predetermined position on the document table;

a second sensor for checking whether or not a document discharged from the document table by the document feeding device reaches the predetermined discharge position;

a counter device for checking the number of documents fed to the predetermined position on the document table by the document feeding device, on the basis of results of checking obtained by the first and second sensors; and display means for displaying an operating condition, a document being jammed in the document feeding device, and a way for removing the document jammed in the document feeding device, wherein:

when documents are detected as having reached the predetermined position on the document table, the counter device counts the number of documents having reached the present position, when the first and second sensors detect either one of a situation where the documents do not reach the predetermined position of the document table or a situation where the documents are not discharged to the predetermined discharge position, a value the counter device shows then is maintained, and the display device is controlled to indicate that all documents should be set in a document holder section once again, including documents from which image information are read for image formation, a document jammed in the document feeding device, and documents remaining in the document holder section, and when the first sensor detects that all jammed documents are removed and set again, a document whose order has a predetermined relationship with the value the counter device shows then is fed to the predetermined discharge position without being stopped on the document table, and a document whose order is determined by adding "1" to the predetermined relationship and subsequently-fed documents are temporarily stopped at the predetermined position on the document table and are discharged to the predetermined discharge position after document images are read therefrom.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
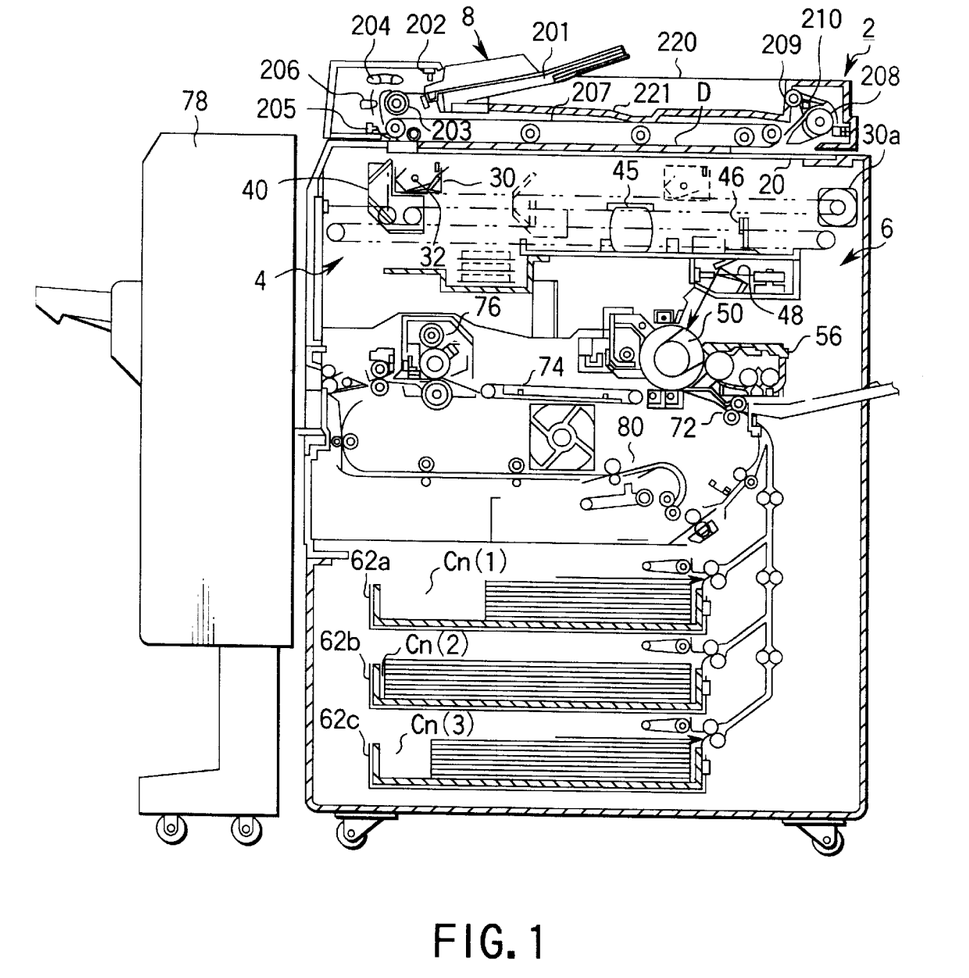
FIG. 1 is a schematic illustration of a digital copying apparatus (i.e., an example of an image forming apparatus) according to an embodiment of the present invention.

As shown in FIG. 1, a digital copying apparatus 2, i.e., one type of an image forming apparatus, comprises an image reading section 4, an image forming section 6 and an automatic document feeder (ADF) 8. The image reading section 4 reads image information corresponding to an image on a document. The image forming section 6 forms an image corresponding to the image data read by the image reading section 4, and outputs the image to a recording sheet.

The ADF 8 feeds documents D to the image reading section 4 one by one. After copies are made, the documents D are discharged and stacked on a discharge tray 221, which is provided on a cover 220. The ADF 8 is rotatable with reference to a document table (which will be describe later) and serves as a document push member as well.

The image reading section 4 comprises a document table 20 on which a document D to be read is placed. Since the document table 20 is covered with the ADF 8, the document D placed on the table 20 (or fed by the ADF 8) is brought into tight contact with the document table 20.

Figure 2:
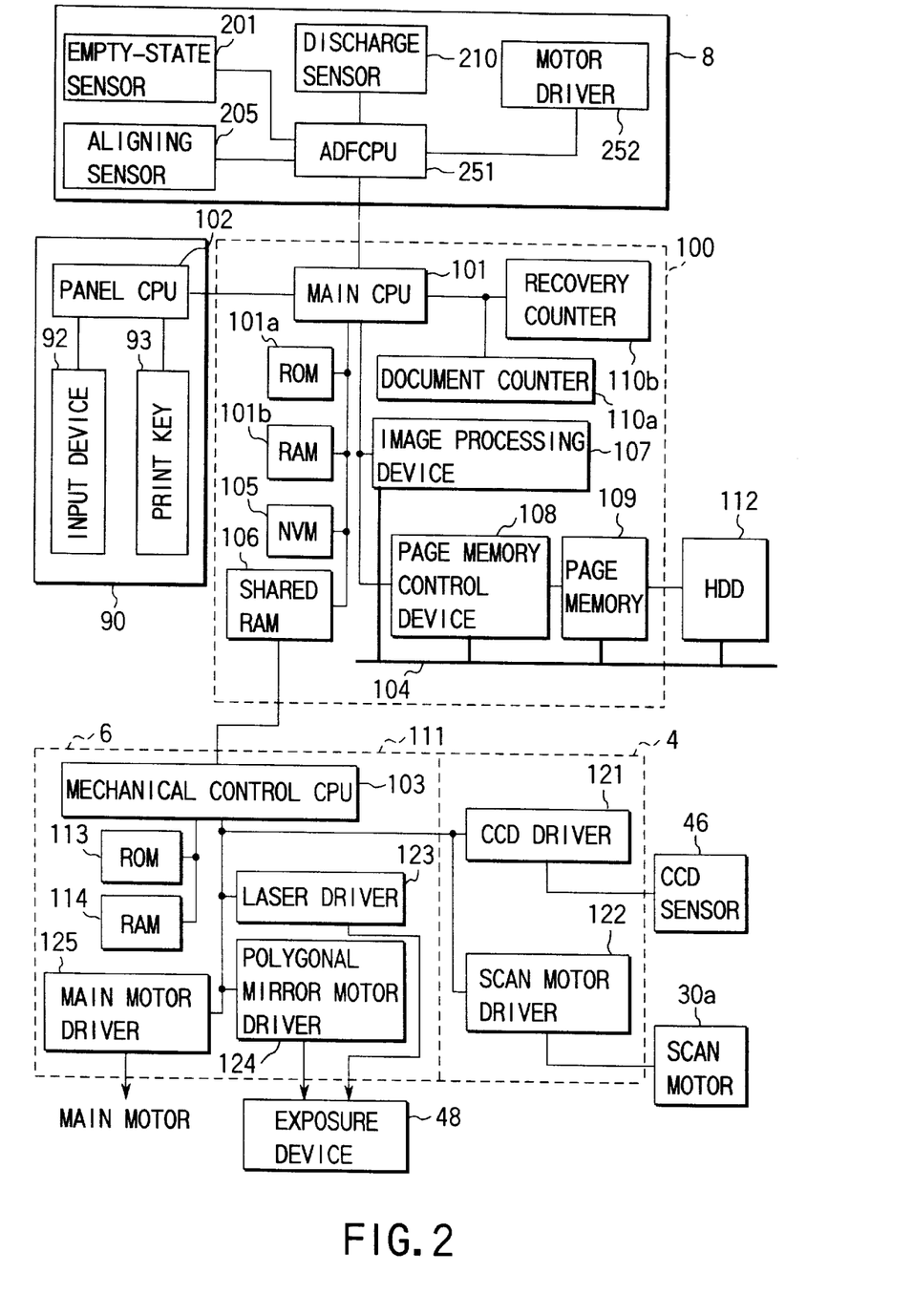
FIG. 2 is a schematic block diagram illustrating how the structural components of the digital copying apparatus shown in FIG. 1 are electrically connected to one another and how signals for control are exchanged among them.

As shown in FIG. 2, the copying apparatus 2 comprises a main controller 100, and a mechanism controller 111 connected to the main controller 100. The main controller 100 includes a main CPU 101 serving as a main control device. The mechanism controller 111 controls an image reading section 4 and an image forming section 6.

The main CPU 101 of the main controller 100 is connected to a panel CPU 102 provided for a control panel 90. The main CPU 101 is also connected to a mechanical control CPU 103 provided for the mechanism controller 111. The main CPU 101 exchanges signals with the panel CPU 102 and the mechanical control CPU 103 and outputs signals allowing execution of predetermined kinds of control. The ADF 8 includes an ADF CPU 251, and this CPU is electrically connected to the mechanical control CPU 103. An image bus line 104, by which image signals are transferred, is connected to the main CPU 101.

In response to an operation command output from the main CPU 101, the mechanical control CPU 103 first executes the operation designated by the operation command, and then informs the main CPU 101 of the operation status. Information on the operation status of the mechanism controller 111, namely that of the image reading section 4, that of the image forming section 6 and that of the ADF 8, are supplied to the main CPU 101. In this manner, the main CPU 101 is informed of the operation status of the mechanism controller 11. On the basis of the operation status and signals entered from the control panel 90 (which will be described in detail later with reference to FIG. 3), the main CPU 101 controls the entire copying apparatus 2.

To the main CPU 101, the following structural components are connected: a ROM 101a in which a control program is stored; a RAM 101b for temporarily storing data; a NVM (nonvolatile memory) 105 which is backed up by a battery and enables data to be retained even after the power supply is switched off; a shared RAM 106 which is used for bilateral communications between the main CPU 101 and the mechanical control CPU 103; an image processing device 107; a page memory control device 108; a page memory 109; etc.

A document counter 110a and a recovery counter 110b are connected to the main CPU 101. The document counter 110a is used for checking a document feed state (which will be described in detail later). The recovery counter 110b is used for counting the number of documents from which image information on document images have been read or the number of documents whose document images have been copied.

In accordance with input signals entered from the control panel 90 (which will be described later with reference to FIG. 3), the panel CPU 102 supplies the main CPU 101 with signals with which to operate the image reading section 4 and the image forming section 6. In addition, the panel CPU 102 receives control signals from the main CPU 101. Based on the control signals, the panel CPU 102 performs a predetermined display operation or temporarily prohibits entry of subsequent input signals.

A ROM 113 and a RAM 114 are connected to the mechanical control CPU 103. The ROM 113 stores a control program, and the RAM 114 is used for temporarily storing data.

A laser driver 123, a polygonal mirror motor driver 124, and a main motor driver 125 are also connected to the mechanical control CPU 103. The laser driver 123 is used for controlling the light emission of a semiconductor laser (not shown), which is included in an exposure device 48. The polygonal mirror motor driver 124 is used for controlling the rotation of a polygonal mirror motor, which is also included in the exposure device 48. The main motor driver 125 is used for controlling the rotation of a main motor (not shown), which drives a photosensitive drum 50 and the structural components of the sheet feed system. The structural components include heat rollers (a description omitted) employed in a developing device 56 and a fixing device 76.

The mechanical control CPU 103 is connected to various driving circuits. The driving circuits include: a CCD driver 121 used for driving a CCD sensor 46; and a scan motor driver 122 used for controlling the rotation of a scan motor 30a which moves first and second carriages 30 and 40 at predetermined speeds. The mechanical control CPU 103 supplies predetermined control signals to the driving circuits, and monitors status signals sent from the driving circuits. The status signals from the driving circuits are supplied to the main CPU 101 as signals representing the operating condition of the mechanism controller 111, i.e., as signals representing the operating conditions of the image reading section 4 and the image forming section 6.

Figure 3:
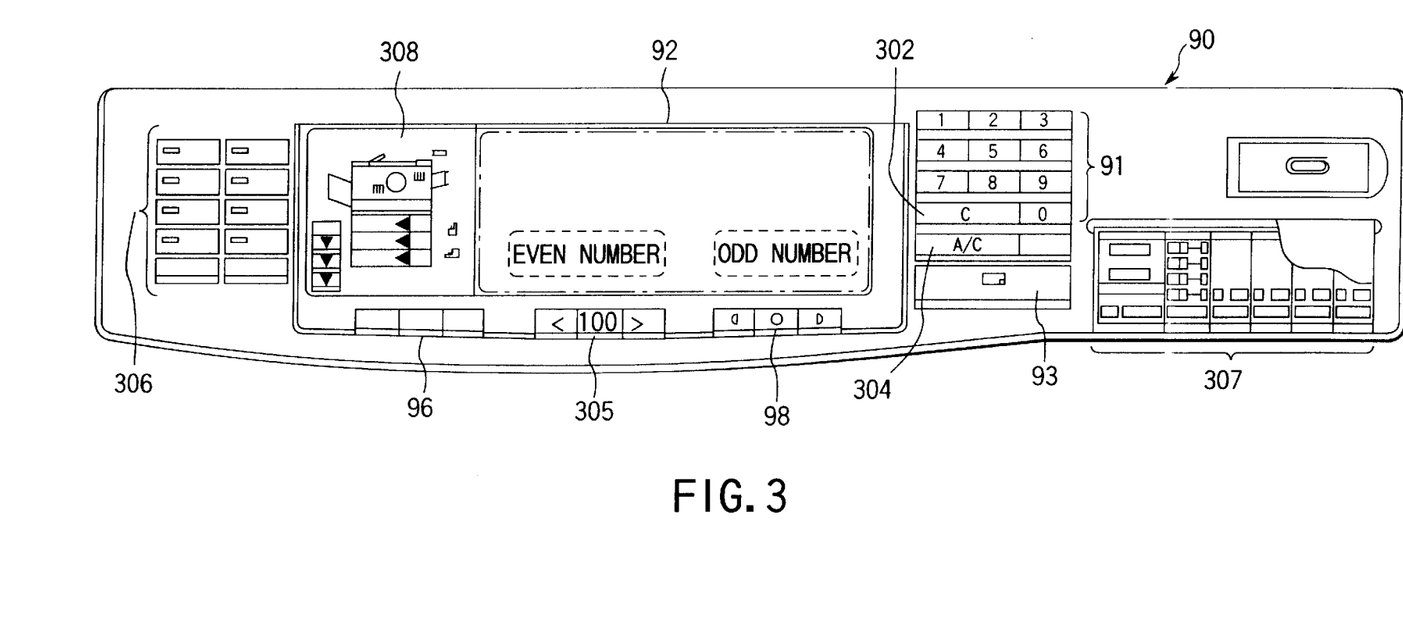
FIG. 3 is a schematic view of a control panel to be incorporated in the copying apparatus shown in FIGS. 1 and 2.

FIG. 3 is a schematic plan view of a control panel employed in the digital copying apparatus shown in FIGS. 1 and 2.

As shown in FIG. 3, the control panel 90 comprises a ten-key pad 91, an input device 92 and a start button 93. The ten-key pad 91 is a number-entering pad used for designating the number of copies to be made and for entering the numbers for facsimile transmission. The input device 92 is provided with a liquid crystal display serving as a touch sensor panel as well. The liquid crystal display shows a plurality of input keys with which the destination of signal transmission can be entered in katakana. It also shows the operating condition or procedures of the copying apparatus 2. The start button 93 is used for designating the start of a copying operation.

The touch sensor panel 92 shows a variety of display patterns and input key areas, which are indicated in accordance with the operating mode, such as the copying mode and the facsimile mode, on the basis of the display data stored in the ROM 101a. For example, the touch sensor panel 92 shows areas enabling entry of an odd number and an even number.

The control panel 90 also comprises a cassette switching key 96 and a density adjusting key 97. The cassette switching key 96 is used for designating a cassette that contains sheets of the size desired by the user. The density adjusting key 97 is used for determining the density at which output images on the sheets are formed.

The ten-key pad 91 is provided with ten number keys corresponding to "0" to "9."

Arranged in the neighborhood of the number keys are: a clear key 302 for clearing numerical data and data entered on the condition input menu; an all-clear key 304 for clearing all copying conditions that are entered and set; a magnification setting key 305 for setting a copying magnification; a finisher setting key 306 for setting the operation of a finisher 78; a mode setting key 307 for setting the operations of the ADF and a reversing device when the copying machine is in the mode where images on both sides of an original document are read and copied onto both sides of a copying sheet or the mode where images on one side of an original document are read and copied onto both sides of a copying sheet; and an LED panel 308 on which the conditions of the copying apparatus 2, such as an out-of-paper condition and a paper-jam condition, are indicated.

The operation of the copying apparatus shown in FIGS. 1 to 3 will be described, referring to the flowchart shown in FIG. 4.

When an arbitrary number of documents D are set on the document tray 201 of the ADF 8, this state is sensed by an empty-state sensor 202 of the ADF 8. In response to this, the ADF CPU 251 informs the main CPU 101 that the apparatus is in the standby mode (i.e., a state where the start button 93 can be turned on).

When the start button 93 is turned on in the standby mode, the main CPU 101 determines that a copying operation has been started. In other words, the standby mode is canceled, and the operation of the copying apparatus 2 is started, In response to the start button 93 being turned on, the count N of the document counter 110a connected to the main CPU 101 is reset as "N←0". The number of copies M entered from the control panel 90 is set as the number of copies to be made (Step S1).

Subsequently, the ADF CPU 251 of the ADF 8 outputs a motor driving signal and supplies it to the motor driver 252. As a result, a motor driving pulse (current) corresponding to the magnitude (current value) of the motor driving signal is supplied to the motor (not shown).

When a predetermined current (pulse) is supplied to the motor, a pickup roller 203 and a sheet supply roller 204 are rotated for a predetermined length of time, the bottom one of the documents D set on the document tray 201 (i.e., the document D in contact with the document tray 201) is fed toward an aligning roller 206. Then, the aligning roller 206 and a conveyor belt 207 are biased at predetermined timings. Accordingly, the first one of the documents D conveyed from the document tray 201 is fed to the predetermined position on the document table 20 (Step S2).

Let us assume that the document D is jammed when it is being fed toward the document table 20 by the ADF 8. This state is sensed based on the output produced from an alignment sensor 205. When the document D is fed in a normal manner, the output of the analog sensor 205 is temporarily switched ON in response to the document D being sensed. Since the output of the alignment sensor 205 is switched OFF after the elapse of the period of time determined by the length of the document D, it is possible to determine whether the document D is jammed in the feeder mechanism of the ADF 8. To be more specific, when the document D is fed to the document table 20 in a normal manner, the output of the alignment sensor 205 is switched OFF. Therefore, if the output of the sensor 205 is not switched OFF even after the elapse of the predetermined time, the document D is determined to have been jammed (S3).

If, in step S3, a document jam (the jamming of a document D in the feeder mechanism) is not detected ("No" in Step S3), "1" is added to the count of the document counter N in step S4 ("N←N+1").

When the document D has been fed to the predetermined position on the document table 20, the image information on the document D set on the document table 20 are copied by executing a coping operation a number of times corresponding to the number of copies M entered from the control panel 90.

Since the copying operation in the electrostatic image formation process is known in the art, a detailed description thereof will be omitted herein. The copying operation can be summarized as follows:

First, image information recorded on the document D placed on the document table 20 are illuminated by an illumination lamp 32, and the reflected light from the document D is made to pass through a focusing lens 45 and focused on the read area (not shown) of the CCD sensor 46. The reflected light is focused on the read area by the first and second carriages 30 and 40 which are driven at the predetermined speed in accordance with the rotation of the motor 30a.

Image signals obtained by the photoelectric conversion by the CCD sensor 46 and corresponding to the document image are supplied to the image processing device 107 for shading correction and binarization. In addition, image processing is carried out on the basis of character recognition and predetermined image processing routines, such as identification, so as to generate image data.

Image data are stored in the page memory 109 by the page memory control device 108. The image data are supplied from the shared RAM 106 to the laser driver 123 in response to a print request made by the main CPU 101.

In accordance with a laser driving signal from the laser driver 123, the laser beam emitted from the exposure device 48 to the photosensitive drum 50 is controlled in intensity, and an electrostatic latent image is formed on the outer circumference of the photosensitive drum 50.

The electrostatic latent image is developed by supplying toner thereto from the developing device 56, thereby obtaining a toner image. From one of sheet cassettes Cn(1), Cn(2) and Cn(3) received in cassette slots 62a, 62b and 62c, a sheet P is fed to a timing roller 72 at the timings described above. With this timing roller 72, the leading end of the sheet P is adjusted in timings with reference to the front end position of the toner image area of the photosensitive drum 50. Subsequently, the toner image is transferred onto the sheet P.

The sheet P, bearing the toner image thereon, is guided to the fixing device 76. By this device 76, heat and pressure are applied to the toner image so that the toner can be fixed on the sheet P. In this manner, a copy image is obtained.

The sheet P, on which the toner image is fixed by the fixing device 76, is discharged onto a stacker 78. Sheets discharged on this stacker are bound together by means of staples or they are sorted and held.

Figure 4:
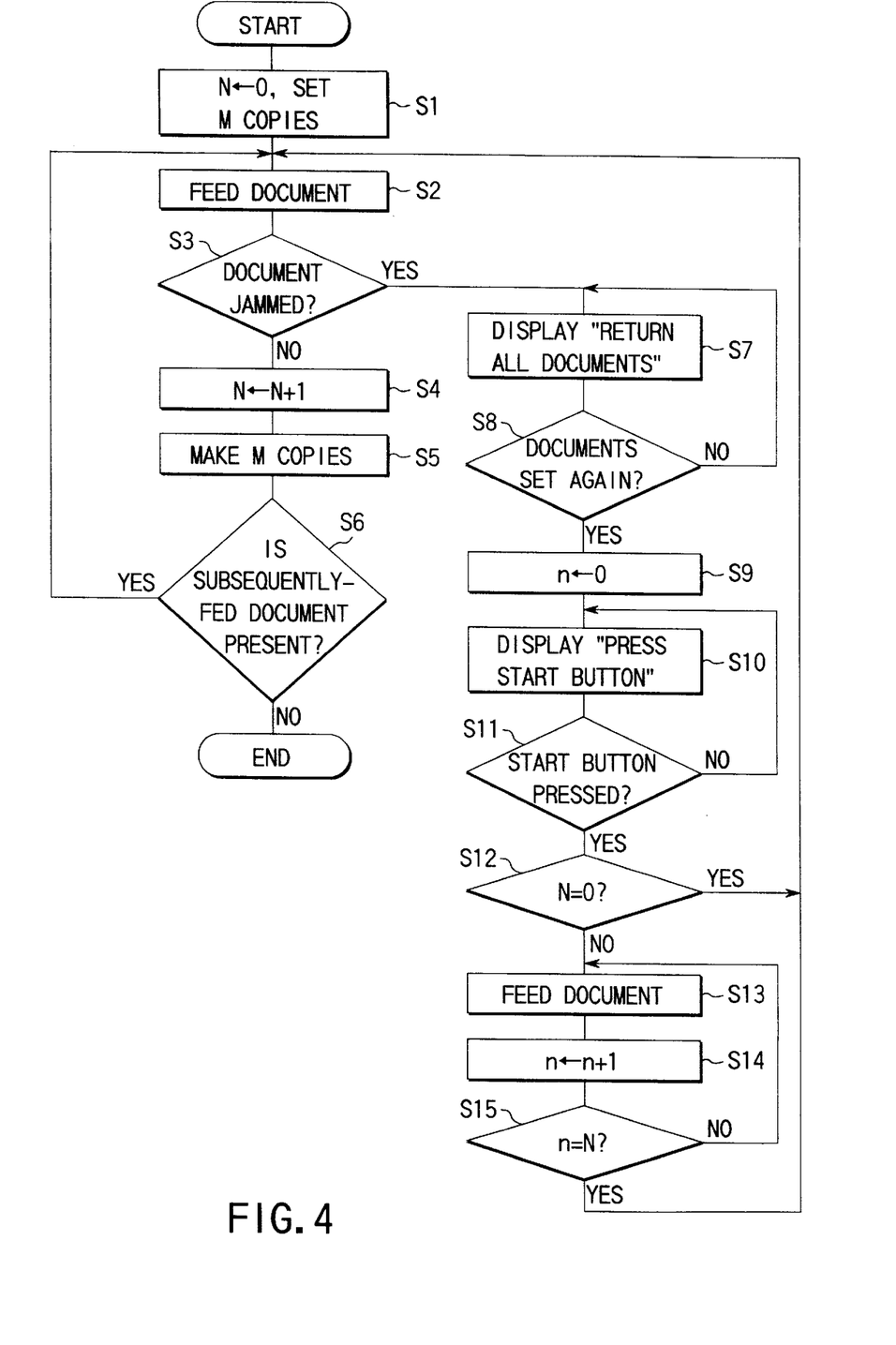
FIG. 4 is a flowchart illustrating an example of a manner in which automatic document feed is controlled in the copying apparatus shown in FIGS. 1–3.

Turning back to the flowchart shown in FIG. 4, image data held in the page memory are stored in a large-capacity memory device, that is, a hard disk memory (HDD) 112 (step S5).

After all copying operations required for making the number of copies designated from the control panel 90 come to an end in step S5 (or at predetermined timings during the last copying operation), the empty-state sensor 202 senses whether or not there is subsequently-fed document D in step S6. If such a document D is sensed ("YES" in Step S6), step S2 is executed to feed the document D. If it is determined on the basis of the output of the empty-state sensor 202 that there is no subsequent document D ("NO" in step S65), then the copying operation is brought to an end.

If step S3 detects that a document D is jammed in the ADF 8 (i.e., if a predetermined period of time has elapsed in the state where the output of the aligning sensor 205 indicates the presence of the document D), the ADF CPU 251 notifies the main CPU 101 of the occurrence of the document jam ("YES" in Step S3).

In response to the notification of the occurrence of the document jam, the panel CPU 102 connected to the main CPU 101 causes a font ROM and a character generator (neither is shown) to generate a predetermined character string. The touch sensor panel 92 of the control panel 90, a message indicating the occurrence of a document jam is shown. An example of the message is "DOCUMENT JAMMED. REMOVE ALL DOCUMENTS AND SET THEM AGAIN." Along with this message, a message requesting a recovery operation is indicated (Step S7).

In response to the messages displayed in step S7, the user takes all documents out of the apparatus, including a document jammed in the apparatus, documents D from which images have been copied, and documents D from which images have not yet been copied. After arranging the documents D in the original order, the user returns the documents D to the document tray 201. This operation is detected on the basis of the signal output from the empty-state sensor 202 of the ADF 8. In other words, if the signal from the empty-state sensor 202 changes from ON (which indicates the presence of a document) to OFF (which indicates the absence of a document), and then changes again to ON, it is determined that all documents D are arranged in order and set on the document tray 201 again ("YES" in Step S8). If the signal output from the empty-state sensor 201 remains unchanged, the messages displayed in step S7 do not disappear until a resetting command is issued by depressing the all-clear key 304 or the apparatus is set in the initial state by an auto-clear function.

If the answer to step S8 is "YES", this means that all documents are determined as having been set again. In this case, the count of the recovery counter 110b is set to be "0" (step S9), and the message "PRESS START BUTTON" is displayed on the touch sensor panel 92 of the control panel 90 (Step S10).

When the user presses the start button 93 in response to the message displayed in step S10 ("YES" in Step S11), a check is made in step S12 whether or not the jammed document D detected in Step S3 is the first one.

If step S12 shows that the jammed document D is the second document or a subsequently-fed document ("NO" in step S12), the document D which is included among the documents D set on the document tray 201 of the ADF 8 and which is in contact with the document table 20 is fed toward the document table 20 (Step S13). Simultaneous with this, the count of the recovery counter 10b is increased by 1, and the document D fed to the document table is discharged onto the discharge tray 221 without the execution of a copying operation (Step S14). Subsequently, the documents D from which image information have already been read are successively discharged onto the discharge tray 221 in (step S15) until the count N of the document counter 110a and the count n of the recovery counter 110b become equal to each other (N=n). If, in step S12, it is determined that the jammed document D is the first one ("YES" in step S12), image information have not been read from any of the documents. In this case, therefore, the document feed operation is repeated in the same manner as an ordinary copying operation.

If, in step S15, the n-th document D from which image information have already been read is conveyed to the discharge tray 221, the flow returns to step S2. That is, the (n+1)th document D is conveyed to the document table 20 in step S2, a check is made to detect the occurrence of a document jam in step S3, "1" is added to the count N of the document counter 110a in step S4 if a document jam is not detected, and a copying operation is repeated so as to make M copies in step S5. As described above, when the number M of copies to be made is 2 or more, a sequence of image forming steps are repeated until the count m of a document counter (not detailed herein) becomes equal to M (m=M). Thereafter, a check is made in step S6 to see whether or not there are documents D for which a copying operation has not yet been performed. If such documents D are present ("YES" in step S6), step S2 is executed to feed the next document D. If it is determined on the basis of the output of the empty-state sensor 202 that there is no subsequent document D ("NO" in step S65), then the copying operation is brought to an end.

As described above, the copying apparatus 2 of the present invention feeds documents D to the document table 20 by means of the ADF 8. At the end of the copying operation, the documents D are discharged onto the discharge tray 221, and new documents D are set on the document tray 201. If, during this document feed operation, a document D is jammed inside the feeder mechanism of the ADF 8, the copying apparatus 2 urges the user to take all documents, including a document jammed in the feeder mechanism, documents D from which images have been copied and which have been discharged, and documents D from which images have not yet been copied and which is present on the document tray 201. The copying apparatus 2 further urges the user to arrange the documents D in the original order and return them to the document tray 201.

The documents returned to the document tray 201 by the user are sensed. Of the documents D returned, those documents D for which a copying operation has been performed are discharged onto the discharge tray 221, and an image forming operation (a copying operation) is executed only for the jammed document D and the subsequently-fed documents D. Since these operations are performed automatically, it is not necessary for the user to check which document D needs copying. Nor is it necessary for the user to look at the copies that have been made so as to identify the document D that is jammed in the feeder mechanism.

To be more specific, the document D jammed in the ADF 8 does not increase or update the count N of the document counter. Accordingly, the main CPU 101 can determine that a copying operation has been performed until the Nth document, and that the (N+1)th document is jammed and is not subjected to a copying operation. Based on this determination, the documents D that are re-set on the document tray 201 (within a predetermined length of time from the occurrence of a document jam) are fed to the discharge tray 221 without execution of a copying operation, until the count N of the document counter 110a and the count n of the recovery counter 110b become equal to each other (n=N). A copying operation is executed with respect to the (N+1)th document D and the subsequent documents D.

Figure 5:
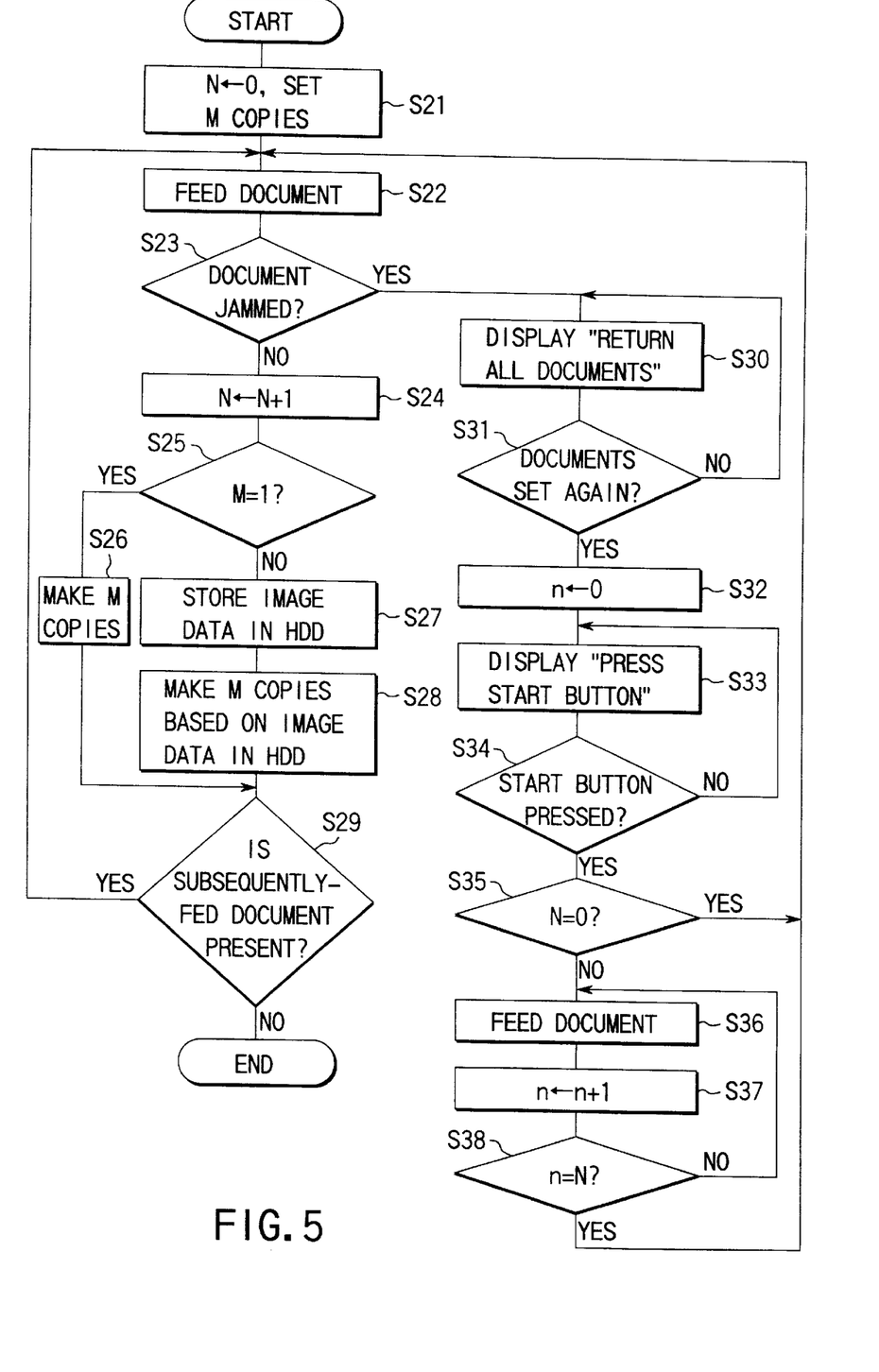
FIG. 5 is a flowchart illustrating operations required of the user during a copying operation.

The operation shown in FIG. 4 is a repetition of a document feeding step and an image copying operation and is applicable to an analog copying apparatus as well. Since the copying apparatus shown in FIGS. 1–3 is a digital type, the operation shown in FIG. 5 may be preferable. Referring to FIG. 5, a copying operation is started in response to the start button 93 being pressed. First of all, the count N of the document counter 110a connected to the main CPU 101 is reset ("N←0"). The number M of copies entered from the control panel 90 is set as the count of a copy counter (not shown) in step S21.

Subsequently, the first document D fed from the document tray 201 is conveyed to the predetermined position on the document table 20 (step S22).

The document D conveyed in step S22 is monitored by the aligning sensor 205, so as to check whether the document D is jammed in the feeder mechanism of the ADF 8 (Step S23). If a document jam is not sensed ("NO" in step S23), "1" is added to the count N of the document counter in step S24.

When, after steps S22–S24, a document D is conveyed to the predetermined position on the document table 20, the image information on the document are copied by a number of times corresponding to the number of copies entered from the control panel 90. At the time, a check is first made in step S25 to see whether or not a single copy is to be made. If this is the case ("YES" in step S25), the laser beam emitted from a laser element (not shown) of the exposure device 48 is controlled in intensity in accordance with an image signal stored in the page memory 109, and the intensity-controlled laser beam is radiated onto the photosensitive drum 50, thereby forming an electrostatic latent image. The electrostatic latent image is then developed with toner, and the resultant toner image is transferred and fixed on a sheet (step S26).

If two or more copies are to be made ("NO" in step S25), the image signal supplied from the CCD sensor 46 and held in the page memory 109 is stored in a large-capacity memory device, that is, the hard disk memory (HDD) 112 (step S27). Through the shared RAM 106, the image signal is output to the exposure device 48 a necessary number of times (which correspond to the number M of copies to be made), so as to copy the image information of the document. As can be seen from this, a reading step, in which the image information on the document D are converted into image signals by the CCD sensor 46, is executed only once.

In either step S26 or steps S27 and S28, a copying operation is executed a number of times which corresponds to the number of copies entered from the control panel 90. At the end of the copying operation (or at predetermined timing during the last of the copying operations executed for preset number M), the empty-state sensor 202 senses whether or not there is a document D to be fed subsequently (Step S29). If there is such a document D ("YES" in Step S29), it is fed in step S22. If the output of the empty-state sensor 202 shows that there is no document D to be subsequently fed ("NO" in Step S29), the copying operation is brought to an end.

If the document D is jammed, and the occurrence of this document jam is sensed in step S23 ("YES" in Step S23), a message indicating the occurrence of the jam is shown. An example of the message is "DOCUMENT JAMMED. REMOVE ALL DOCUMENTS AND SET THEM AGAIN." Along with this message, a message requesting a recovery operation is indicated (Step S30).

In response to the messages displayed in step S30, the user takes all documents out of the apparatus, including a document D jammed in the apparatus, documents D from which images have been copied, and documents D from which images have not yet been copied. After arranging the documents D in the original order, the user returns the documents D to the document tray 201. This operation is detected on the basis of the signal output from the empty-state sensor 202 of the ADF 8. In other words, if the signal from the empty-state sensor 202 changes from ON (which indicates the presence of a document) to OFF (which indicates the absence of a document), and then changes again to ON, it is determined that all documents D are arranged in order and set on the document tray 201 again ("YES" in Step S31). If the signal output from the empty-state sensor 201 remains unchanged, the messages displayed in step S7 do not disappear until a resetting command is issued by depressing the all-clear key 304 or the apparatus is set in the initial state by an auto-clear function.

If the answer to step S31 is "YES", this means that all documents D are determined as having been set again on the document tray 201. In this case, the count of the recovery counter 110b is set to be "0" (step S32), and the message "PRESS START BUTTON" is displayed on the touch sensor panel 92 of the control panel 90 (Step S33).

When the user presses the start button 93 in response to the message displayed in step S33 ("YES" in Step S34), a check is made in step S35 to see whether or not the jammed document D detected in Step S3 is the first one.

If step S35 shows that the jammed document D is the second document or a subsequently-fed document ("NO" in step S35), the document D which is included among the documents D set on the document tray 201 of the ADF 8 and which is in contact with the document table 20 is fed toward the document table 20 (Step S36). Simultaneous with this, the count n of the recovery counter 110b is increased by 1, and the document D fed to the document table is discharged onto the discharge tray 221 without the execution of a copying operation (Step S37).

Subsequently, in step S37, the documents D are successively conveyed from the document tray 201 to the discharge tray 221, without the execution of a copying operation, until the count N of the document counter 110a and the count n of the recovery counter 110b become equal to each other (N=n). If, in step S36, it is determined that the jammed document D is the first one ("YES" in step S36), image information have not been read from any of the documents. In this case, therefore, the document feed operation is repeated in the same manner as an ordinary copying operation.

If, in step S38, the n-th document D from which image information have already been read is conveyed to the discharge tray 221, the flow returns to step S22. That is, the (n+1)th document D is conveyed to the document table 20 in step S22, a check is made to detect the occurrence of a document jam in step S23, "1" is added to the count N of the document counter 110a in step S24 if a document jam is not detected, and a copying operation is repeated so as to make M copies in step S25. As described above, when the number M of copies to be made is 2 or more, a sequence of image forming steps are repeated until the count m of the document counter (not detailed herein) becomes equal to M (m=M). Thereafter, a check is made in step S26 to see whether or not there are documents D for which a copying operation has not yet been performed. If such documents D are present ("YES" in step S26), step S22 is executed to feed the next document D. If it is determined on the basis of the output of the empty-state sensor 202 that there is no subsequent document D ("NO" in step S26), then the copying operation is brought to an end.

The digital copying apparatus shown in FIG. 5 is provided with special copying modes, such as "page replacing", "image rotation (direction alignment)", and "sheet insertion." When one of these special copying modes is selected, the apparatus can store image information on all documents D in the hard disk memory (HDD) 112 before forming output images. In this operating mode, the documents that are fed until the occurrence of a document jam are conveyed to the document table 20 once again, and are then discharged without execution of a copying operation. In parallel to this, image forming operations may be executed on the basis of the image data stored in the hard disk memory 112.

Figure 6:
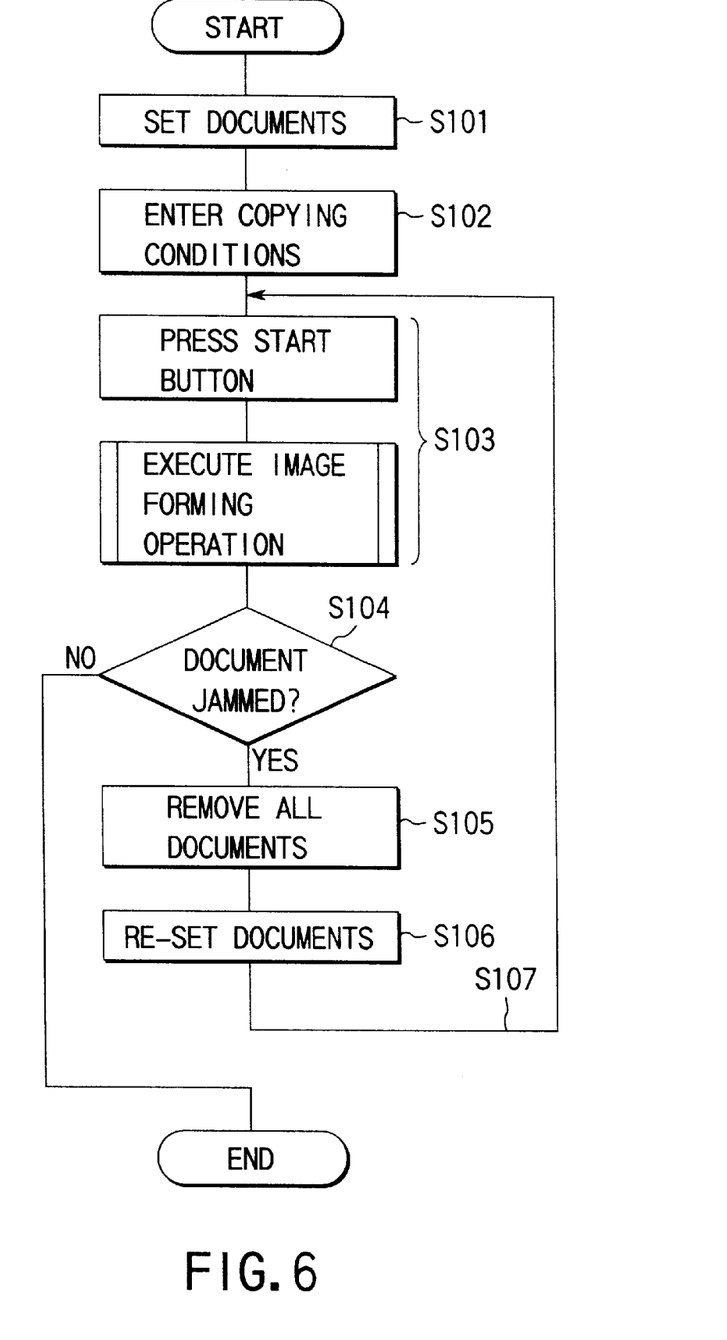
FIG. 6 is a flowchart illustrating another example of a manner in which automatic document feed is controlled in the copying apparatus shown in FIGS. 1–3.

FIG. 6 shows operation procedures that have to be taken by the user so as to achieve the copying operation shown in FIGS. 4 and 5. As shown in FIG. 6, the user sets documents (from which copies are to be made) on the document table 201 of the ADF 8 (Step S101), and then enter the number of copies, a copying mode, etc. from the control panel 90 (Step S102).

When the user presses the start button 93, the copying forming operation is started (Step S103). Unless a document jams, the user is only required to wait for all copying operations to end (Step S104).

If step S104 senses the occurrence of a document jam ("YES" in Step S104), the user removes the document jammed in the ADF 8 and the documents that become stationary in the conveyance path (Step S105).

In accordance with the message displayed on the display section (the touch sensor panel) 92 of the control panel 90, the user combines the removed documents with the documents which have been discharged on the discharge tray and the documents which have not yet been fed. The user arranges the documents in the original order and put them on the document table 201 once again (Step S106).

In accordance with the message "PRESS START BUTTON" on the display section (touch sensor panel) 92, the user presses the start button 93 (Step S107). Unless a new document jam occurs, all copying operations are repeated. In the meantime, the user waits for the copying operations to end.

As described above, the copying apparatus of the present invention feeds documents D to the document table 20 by means of the ADF 8. Even if a document D is jammed during this document feed operation, what is required of the user is merely to set all documents on the document tray. Documents D from which images have been copied are discharged on the discharge tray, without repeating a copying operation. Only those documents D from which images have not yet been copied are subjected to a copying operation.

As can be seen from the above, even if an error occurs in the document feed, the images of the copies need not be compared with the images of the documents which stop and are stationary in the conveyance path. In addition, there is no need to selectively re-set the documents on the automatic document feeder. Accordingly, the time needed for the copying operation is short. The user does not have to wait for a long time before the completion of the copying operation; in other words, the operation for removing the document jam and restoring the copying apparatus is not a heavy load to the user.

Figure 7A:
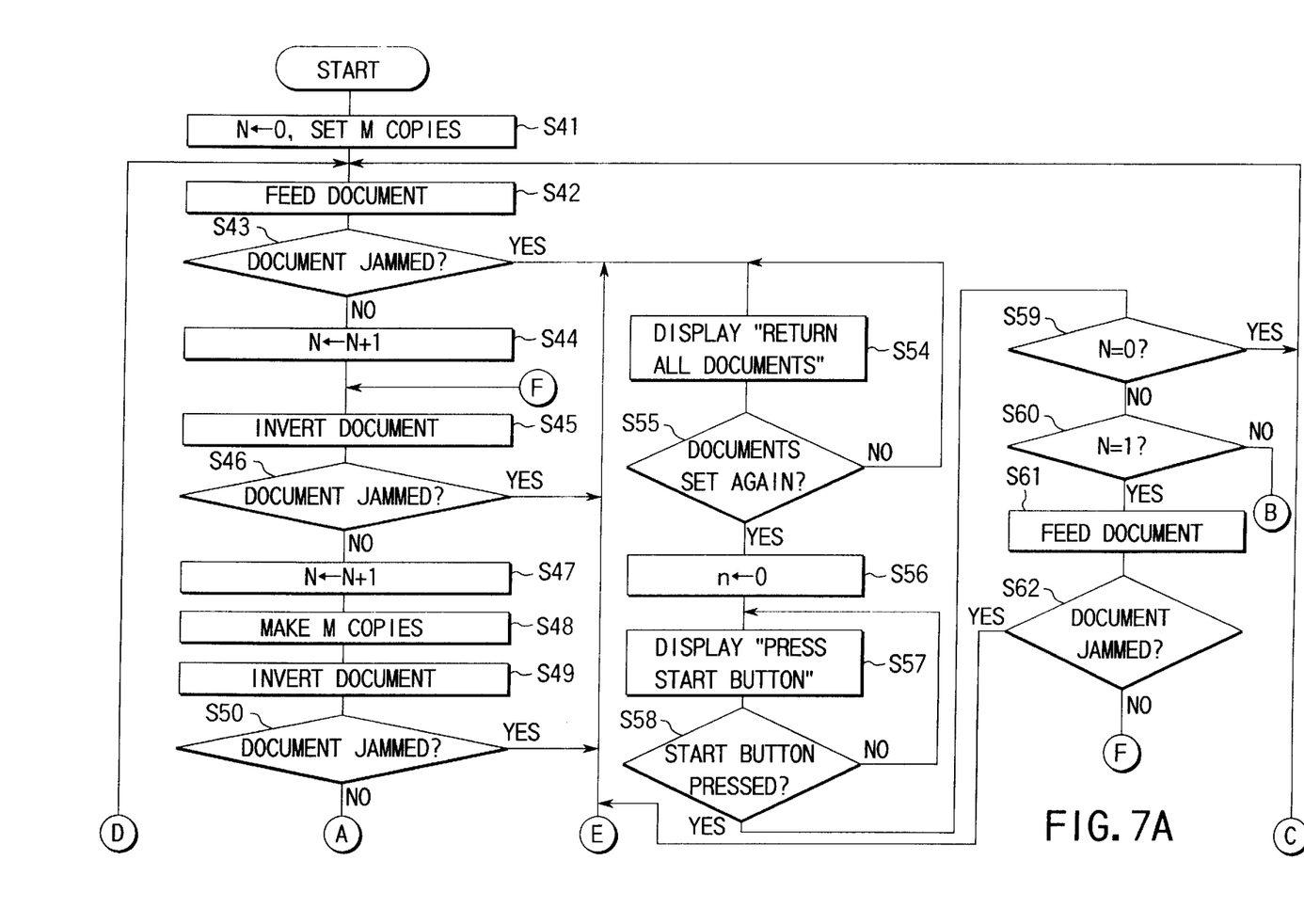
FIGS. 7A and 7B are flowcharts showing still another example of a manner in which Automatic document feed is controlled in the copying apparatus shown in FIGS. 1–3.
Figure 7B:
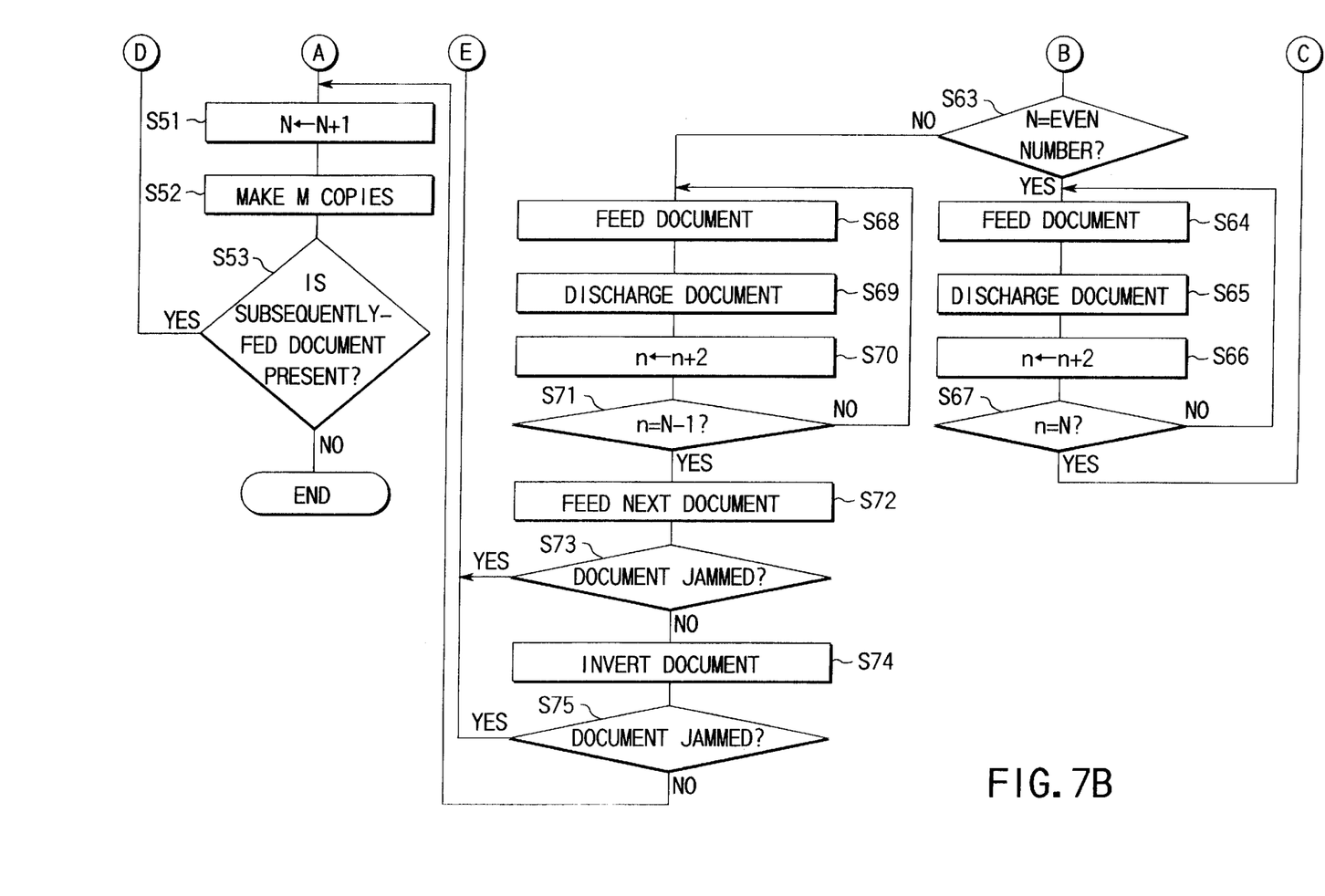

FIGS. 7A and 7B are flowcharts showing how the copying apparatus depicted in FIG. 2 is controlled to attain the "both sides→both side" copying mode, i.e., a mode in which images shown in on both sides of a document D are copied to both sides of a sheet.

As shown in FIGS. 7A and 7B, the copying operation is started in response to the start button 93 being turned on by the user. First of all, the count N of the document counter 110a connected to the main CPU 101 is reset as "N←0". The number M of copies entered from the control panel 90 is set as the count of a copy counter (not shown) in step S41.

Subsequently, the first document D fed from the document tray 201 is conveyed to the predetermined position on the document table 20 (step S42).

The document D conveyed in step S42 is monitored by the aligning sensor 205, so as to check whether the document D is jammed in the feeder mechanism of the ADF 8 (Step S43). If a document jam is not sensed ("NO" in step S43), "1" is added to the count N of the document counter ("N←N+1" of step S44), and the document D that is being conveyed is inverted (Step S45). Simultaneously, a check is made to see whether or not the document D is jammed during the inversion (Step S46). If no document jam is sensed ("NO" in Step S46), "1" is added to the count N of the document counter ("N←N+1" of Step S47).

When, after steps S43–S47, a document D is conveyed to the predetermined position on the document table 20, the image information on the reverse side of the document are copied by a number of times corresponding to the number M of copies entered from the control panel 90 (Step S48).

Next, the document D which is then on the document table 20 is conveyed to a discharge roller 208, and is then inverted toward a conveyance belt 207 by an inversion mechanism 209. The conveyance belt 207 is moved in the opposite direction, to thereby move the document D to the predetermined position on the document table 20 (Step S49). In the meantime, the output of a discharge sensor 210 is monitored to sense whether or not the document D is jammed in the feed mechanism during conveyance (Step S50). If no document jam is sensed ("NO" in Step S50), "1" is added to the count N of the document counter (Step S51). When, after steps S49–S51, the document D is conveyed to the predetermined position on the document table 20, the image information on the reverse side of the document are copied by a number of times corresponding to the number M of copies entered from the control panel 90 (Step S52).

In step S52, copying operations corresponding to the number M of copies entered from the control panel 90 are executed. At the end of the copying operation (or at predetermined timing during the last of the copying operations executed for preset number M), the empty-state sensor 202 senses whether or not there is a document D to be fed subsequently (Step S53). If there is such a document D ("YES" in Step S53), it is fed in step S42. If the output of the empty-state sensor 202 shows that there is no document D to be subsequently fed ("NO" in Step S53), the copying operation is brought to an end.

If, in steps S43, it is detected that the document D conveyed in the ADF 8 is jammed ("YES" in Step S43, "YES" in Step S46, or "YES" in Step S50), a message indicating the occurrence of a document jam is shown. An example of the message is "DOCUMENT JAMMED. REMOVE ALL DOCUMENTS AND SET THEM AGAIN." Along with this message, a message requesting a recovery operation is indicated (Step S54).

In response to the messages displayed in step S54, the user takes all documents out of the apparatus, including the document D jammed in the apparatus, documents D from which images have been copied, and documents D from which images have not yet been copied. After arranging the documents D in the original order, the user returns the documents D to the document tray 201. This operation is detected on the basis of the signal output from the empty-state sensor 202 of the ADF 8. In other words, if the signal from the empty-state sensor 202 changes from ON (which indicates the presence of a document) to OFF (which indicates the absence of a document), and then changes again to ON, it is determined that all documents D are arranged in order and set on the document tray 201 again ("YES" in Step S55). If the signal output from the empty-state sensor 201 remains unchanged, the messages displayed in step S53 do not disappear until a resetting command is issued by depressing the all-clear key 304 or the apparatus is set in the initial state by an auto-clear function.

If the answer to step S55 is "YES", this means that all documents D are determined as having been set again on the document tray 201. In this case, the count of the recovery counter 110b is set to be "0" (step S56), and the message "PRESS START BUTTON" is displayed on the touch sensor panel 92 of the control panel 90 (Step S57).

When the user presses the start button 93 in response to the message displayed in step S57 ("YES" in Step S58), a check is made in step S59 to see whether or not the jammed document D detected in Step S43, S46 or S50 is the first one.

If step S59 shows that the jammed document D is the second document or a subsequently-fed document ("NO" in step S59), a check is made in step S60 to see whether the image information on the reverse side of the document D have already been read.

If step S60 shows that the image information on the reverse side of the document have been read ("YES" in Step S60), the document D set on the document tray 201 is fed to the predetermined position on the document table 20 without being inverted (Step S61). In step S62, a check is made to detect the occurrence of a document jam in a similar manner to that of steps S43, S46 and S50. If no document jam is detected ("NO" in step 62), "1" is added to the count N of the document counter 110a ("N←N+1" of step S44).

If step S60 shows that the count N of the document counter 110a is "2" or greater ("NO" in Step S60), then a check is made in Step S63 to see whether or not the count N is even.

If step S63 shows that the count N of the document counter 110a is even ("YES" in Step S63), the document D which is included among the documents D set on the document tray 201 of the ADF 8 and which is in contact with the document table 201 is fed toward the document table 20 (Step S64). Without being stopped at the document table 20, the document D is discharged onto the discharge tray 221 (Step S65). In addition, "2" is added to the count n of the recovery counter 110b.

Subsequently, in step S64 (Steps S64–67), the documents D are successively conveyed from the document tray 201 to the discharge tray 221, without the execution of a copying operation, until the count N of the document counter 110a and the count n of the recovery counter 110b become equal to each other (N=n).

With Steps S64–S67 repeatedly executed, n documents D are discharged without execution of a copying operation. Thereafter, the flow returns to step S42, so as to feed the subsequent documents set on the document tray 201 and execute an ordinary operation for them.

If step S63 shows that the count N of the document counter 110a is not even ("NO" in Step S63), the document D which is included among the documents D set on the document tray 201 of the ADF 8 and which is in contact with the document table 201 is fed toward the document table 20 (Step S68).

Without being stopped at the document table 20, the document D is discharged onto the discharge tray 221 (Step S69). In addition, "2" is added to the count n of the recovery counter 110b.

Subsequently, in step S70 (Steps S68–71), the documents D are successively conveyed from the document tray 201 to the discharge tray 221, without the execution of a copying operation, until the count N of the document counter 110a and the count n of the recovery counter 10b satisfy the relationship "n=N−1."

With Steps S68–S71 repeatedly executed, n documents D are discharged without execution of a copying operation, until the relationship "n=N−1" is satisfied. Thereafter, the next document is fed to the original table 20 (Step S72), the occurrence of a document jam is detected (Step S73), and the document is inverted by the inversion mechanism of the ADF 8 (Step S74) if no document jam is detected (i.e., if the document is fed without causing any problems).

The occurrence of a document jam is detected again in Step S75. If no document jam is detected, i.e., if the document is fed without causing any problems ("NO" in Step S75), the flow returns to step S51, so as to add "1" to the count N of the document counter 110a and to make M copies on the basis of the image information on the document (Steps S52 and S53).

If it is determined in Step S73 and/or Step 75 that the document is jammed in the ADF 8, then step S53 and the subsequent steps are repeated.

The digital copying apparatus shown in FIGS. 7A and 7B is provided with special copying modes, such as "page replacing", "image rotation (direction alignment)", and "sheet insertion." When one of these special copying modes is selected, the apparatus can store image information on all documents D in the hard disk memory (HDD) 112 before forming output images. In this operating mode, the documents that are fed until the occurrence of a document jam are conveyed to the document table 20 once again, and are then discharged without execution of a copying operation. In parallel to this, image forming operations may be executed on the basis of the image data stored in the hard disk memory 112.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus provided with an automatic document feeder, comprising:

a document table for holding a document;

an image forming section for making a copy of the document by performing an image forming operation, the image forming operation including forming an electrostatic image corresponding to image light which is obtained by radiating light onto the document held on the document table, and supplying a visualizing agent to the electrostatic image;

a document feeding/discharging device for feeding a document to the document table, stopping the document when the document comes to a predetermined position on the documnt table, and discharging the document to a predetermined position away from an image information reading area after image information are read from the document so as to permit the image forming section to execute the image forming operation;

a feed state monitoring device for monitoring how the document is fed or discharged by the document feeding/discharging device;

a display device, operating when a document is jammed in the document feeding/discharging device, which displays an operating condition, a document being jammed in the document feeding/discharging device, and a routine for removing the document jammed in the document feeding/discharging device, and which indicates that all documents should be set in a standby state once again by setting all documents on a document holder section, including documents from which image formation has been read for image formation, the document jammed in the feeding/discharging device, and documents remaining on the document holder section; and a control device which controls feeding and discharging of the documents set on the document holder section based on a result of monitoring by the feed state monitoring device, such that the documents are fed and discharged from a first one of the documents to a document immediately prior to the jammed document without being subjected to the image forming operation of the image forming section, and each of the jammed document and the remaining documents is fed and then discharged after being subjected to the image forming operation of the image forming section.

2. An image forming apparatus according to claim 1, wherein said feed state monitoring device is located upstream of the document table with respect to a direction in which the document is fed.

3. An image forming apparatus according to claim 1, wherein said feed state monitoring device is located between the document table and the predetermined position away from the image information reading area.

4. An image forming apparatus according to claim 1, further comprising a counter device for performing a count operation when a document fed by the document feeding/discharging device is detected as reaching the predetermined position on the document table on the basis of the monitor results output from the feed state monitoring device and when a document located on the document table is detected as reaching the predetermined position away from the image information reading area on the basis of said monitor results.

5. An image forming apparatus comprising:

a document table for holding a document;

an image forming section for making a copy of the document by performing an image forming operation, the image forming operation including forming an electrostatic image corresponding to image light which is obtained by radiating light onto the document held on the document table, and supplying a visualizing agent to the electrostatic image;

a document feeding device including a document holder section for holding a preset number of sheet-like documents, and a feeder mechanism, the feeder mechanism feeding documents from the document holder section to the document table one by one, stopping each of the documents when the document comes to a predetermined position on the document table, and discharging the documents to a predetermined discharge position when images on the documents have been read for the image forming operation;

a plurality of sensors for locating where in the feeder mechanism a document is jammed during a feeding operation;

a display device, operating when the document is jammed in the feeder mechanism, which displays an operating condition, a document being jammed in the feeder mechanism, and a routine for removing the document jammed in the feeder mechanism, and which indicates that all documents should be set in the document holder section once again, including documents from which image information has been read for image formation, the document jammed in the feeder mechanism, and documents remaining in the document holder section; and a feed control device which controls feeding and discharging of the documents set on the document holder section based on a result of monitoring by the plurality of sensors, such that the documents are fed and discharged from a first one of the documents to a document immediately prior to the jammed document without being subjected to the image forming operation of the image forming section, and each of the jammed document and the remaining documents is fed and then discharged after being subjected to the image forming operation of the image forming section.

6. An image forming apparatus according to claim 5, wherein one of said sensors is located upstream of the document table with respect to a direction in which the document is fed.

7. An image forming apparatus according to claim 5, wherein one of said sensors is located between the document table and the predetermined position away from the image information reading area.

8. An image forming apparatus according to claim 5, further comprising a counter device for performing a count operation when a document fed by the document feeding/discharging device is detected as reaching the predetermined position on the document table on the basis of the monitor results output from said plurality of sensors and when a document located on the document table is detected as reaching the predetermined position away from the image information reading area on the basis of said monitor results.

9. An image forming apparatus according to claim 5, further comprising a second counter device for counting those documents which are guided to the predetermined discharge position without stopping on the document table, said second counter device, said second counter device enabling the document feed operation to be controlled on the basis of the position which is detected by the sensors and at which the document is jammed in the feeder mechanism, such that the documents from which the image information are read are fed to the predetermined position without being stopped on the document table, and the documents from which the image information are not read and subsequently-fed documents are temporarily stopped at the predetermined position on the document table and are discharged to the predetermined discharge position after document images are read therefrom for the image forming operation.

10. An image forming apparatus comprising:

a document feeding device for feeding a plurality of documents to a predetermined position on a document table one by one and for discharging the documents from the document table to a predetermined discharge position at predetermined timings;

a first sensor for checking whether or not a document fed by the document feeding device reaches the predetermined position on the document table;

a second sensor for checking whether or not a document discharged from the document table by the document feeding device reaches the predetermined discharge position;

a first counter device for counting documents that are fed to the predetermined position on the document table by the document feeding device, on the basis of results of checking obtained by the first and second sensors;

a display device, operating when a document is jammed in the document feeding device, which displays an operating condition, a document being jammed in the document feeding device, and a routine for removing the document jammed in the document feeding device, and which indicates that all documents should be set in a standby state by setting all documents on a document holder section, including documents from which image formation has been read for image formation, the document jammed in the feeding device, and documents remaining on the document holder section; and a control device which controls feeding and discharging of the documents set on the document holder section based on a result of monitoring by the first and second sensors and the value of the first counter device, such that the documents are fed and discharged from a first one of the documents to a document immediately prior to the jammed document without being subjected to the image forming operation of the image forming section, and each of the jammed document and the remaining documents is fed and then discharged after being subjected to the image forming operation of the image forming section, wherein:
  when the documents are detected as having reached the predetermined position on the document table, the first counter device counts those documents which have reached the preset position,
  when the first and second sensors detect either one of a situation where the documents do not reach the predetermined position of the document table or a situation where the documents are not discharged to the predetermined discharge position, a value shown by the first counter device is maintained, and the display device is controlled to indicate that all documents should be set in the document holder section once again, including documents from which image information are read for image information, a document jammed in the document feeding device, and documents remaining in the document holder section, and
  when the first sensor detects that all jammed documents are removed and set again, a document whose order has a predetermined relationship with the value shown by the first counter device is fed to the predetermined discharge position without being stopped on the document table, and a document whose order is determined by adding "1" to the predetermined relationship and subsequently-fed documents are temporarily stopped at the predetermined position on the document table and are discharged to the predetermined discharge position after document images are read therefrom.

11. An image forming apparatus according to claim 10, wherein said first sensor is located between the document feeding device and the document table.

12. An image forming apparatus according to claim 10, wherein said second sensor is located between the document table and the predetermined discharge position.

13. An image forming apparatus according to claim 10, further comprising:

a second counter device for counting those documents which are guided to the predetermined discharge position without stopping on the document table, said second counter device enabling the document feed operation to be controlled on the basis of the position which is detected by the first and second sensors and at which the document is jammed in the document feeding device, such that the documents from which the image information has been read are fed to the predetermined position without being stopped on the document table, and the documents from which the image information has not been read and subsequently-fed documents are temporarily stopped at the predetermined position on the document table and are discharged to the predetermined discharge position after document images are read therefrom for the image forming operation.

14. An image forming apparatus provided with an automatic document feeder comprising:

a document table for holding a document;

an image forming section for making a copy of the document by performing an image forming operation, the image forming operating including forming an electrostatic image corresponding to image light which is obtained by radiating light onto the document held on the document table, and supplying a visualizing agent to the electrostatic image;

a document feeding/discharging device for feeding the document, when a double-sided copying mode is in effect, such that a first surface of the document faces a platen, reversing the document after copying for the first surface of the document is completed, feeding the document to make the second surface face the platen, and then discharging the document after copying for the second surface of the document is completed;

a feed state monitoring device for monitoring whether the copying for the first surface of the document is completed, and whether the copying for the second surface of the document is completed; and a control device for discharging a jammed document in the double-sided copying mode after the jammed document is re-set and copying for first and second surface of the jammed document is completed.

* * * * *